United States Patent
Holcomb et al.

(10) Patent No.: US 6,454,485 B2
(45) Date of Patent: **\*Sep. 24, 2002**

(54) BI-DIRECTIONAL RETAINER

(75) Inventors: Malin E. Holcomb, Lynnwood, WA (US); Paul D. Lund, Clinton, WA (US)

(73) Assignee: Adaptive Engineering Lab, Inc., Mill Creek, WA (US)

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,494

(22) Filed: Mar. 10, 1999

(51) Int. Cl.$^7$ ................................................. E04B 2/82
(52) U.S. Cl. ........................................ 403/325; 403/327
(58) Field of Search ................................ 403/315, 316, 403/321, 322.1, 325, 385, 363, 322.4, 326, 327, 328; 297/440.22

(56) References Cited

U.S. PATENT DOCUMENTS

| | | | |
|---|---|---|---|
| 1,919,353 A | | 7/1933 | Amor |
| 2,212,859 A | | 8/1940 | Fike |
| 3,561,712 A | | 2/1971 | Newsome et al. |
| 3,893,730 A | \* | 7/1975 | Homier et al. ....... 403/322.4 X |
| 4,404,714 A | \* | 9/1983 | Duran .................... 403/328 X |
| 4,443,128 A | \* | 4/1984 | Yamamoto et al. ......... 403/385 |
| 4,813,810 A | \* | 3/1989 | Suzuki ................... 403/327 X |
| 4,901,421 A | \* | 2/1990 | Takarabe et al. .......... 403/80 X |
| 4,911,348 A | \* | 3/1990 | Rasor et al. ............ 403/381 X |
| 4,988,248 A | \* | 1/1991 | Flux ....................... 403/328 X |
| 4,997,154 A | | 3/1991 | Little |
| 5,052,647 A | | 10/1991 | Axelson et al. |
| 5,102,195 A | \* | 4/1992 | Axelson et al. ........ 297/440.22 |
| 5,127,709 A | | 7/1992 | Rubenstein et al. |
| 5,184,871 A | | 2/1993 | LaPointe et al. |
| 5,364,201 A | \* | 11/1994 | LaBarre ................. 403/327 X |
| 5,394,594 A | \* | 3/1995 | Duran .................... 403/328 X |
| 5,439,268 A | | 8/1995 | Dozsa-Farkas |
| 5,542,776 A | \* | 8/1996 | Reynolds ............... 403/385 X |
| 5,590,934 A | | 1/1997 | Gibbs |
| 5,667,276 A | | 9/1997 | Connelly et al. |
| 5,683,201 A | \* | 11/1997 | Guaron ................... 403/327 X |
| 5,820,291 A | \* | 10/1998 | Lutz ........................... 403/328 |
| 5,857,304 A | \* | 1/1999 | Karten et al. ........... 403/327 X |
| 5,951,086 A | \* | 9/1999 | Hoshino et al. ..... 403/322.4 X |
| 5,954,402 A | \* | 9/1999 | McInturff .............. 297/440.22 |

\* cited by examiner

Primary Examiner—Lynne H. Browne
Assistant Examiner—John R. Cottingham
(74) Attorney, Agent, or Firm—Richardson & Folise

(57) ABSTRACT

A bi-directional retainer for removably securing accessories such as a seat or a back rest to a wheelchair frame. The retainer includes a base mountable on a frame member and a slide mounted on the base for movement between two spaced operating positions. It also includes a spring disposed between the slide and the base providing an over the center action which urges the slide to remain in a selected operating position.

13 Claims, 3 Drawing Sheets

BI-DIRECTIONAL RETAINER

BACKGROUND OF THE INVENTION

This invention generally relates to retaining devices and more particularly to a bi-directional retainer for releasably securing wheelchair accessories to a wheelchair frame.

Most modern wheelchair are foldable or collapsible to facilitate transportation and storage. Such chairs are usually equipped with a rigid seat and back rest which must be removed before the chair can be collapsed. Means must be provided for securely attaching the seat and back rest to the chair while permitting them to be quickly and easily removed. Ideally those attachment means should be easily accessible to the user of the chair or an attendant and should be operable without tools of any sort. They should also be designed to minimize the possibility of accidental disengagement of the seat or back rest. Finally, they should be adaptable for use on existing wheelchair frames and with the J hook type support brackets which are commonly used to attach seats and backs to the frames.

One problem with the design of many attachment devices in the prior art is that they must be mounted to the wheelchair frame in a particular orientation with respect to the seat (or back rest) and its support brackets. Such devices normally require the use of pairs of symmetrically designed components on the frame. As a result such devices are inherently more expensive to manufacture than one consisting of identical and interchangeable components.

Accordingly, it is an object of this invention to provide a bi-directional retainer for attaching a seat and a back rest to a wheelchair and in particular a foldable or collapsible type wheelchair.

Another object of this invention is to provide for such a retainer which will minimize the possibility of an accidental or inadvertent release of the seat or back rest from the wheelchair frame.

Another object of this invention is to provide for such a bi-directional retainer which can be adapted to various wheelchair configurations without significant modifications to the chair.

It is yet a further object of this invention to provide for such a retainer which can function when mounted on either side of a typical J hook seat bracket thereby reducing manufacturing costs by eliminating the need for the use of symmetrical pairs of retainers.

SUMMARY OF THE INVENTION

This invention can be broadly summarized as providing for a bi-directional retainer for removably securing a seat, a back rest or other accessories to a wheelchair frame. The retainer includes a base, a slide mounted on the base for movement between two spaced operating positions and a means for biasing the slide toward one of those operating systems when the slide is displaced toward a desired operating position from a neutral position located in between the two operating positions.

In accordance with a more detailed aspect of the invention the slide is mounted on a track attached to the base and the biasing means includes a spring. The frame also includes means for mounting the base on a wheelchair frame.

In accordance with a yet more detailed aspect of this invention the base includes a pair of parallel oriented tracks and the slide is mounted on the tracks for movement between the two operating positions. Also the retainer includes a mounting clamp having a leg fixed to the base, a second leg pivotally mounted to the base and a screw for adjustably connecting the first and second legs.

DETAILED DESCRIPTION OF THE PREFERRED EMBODIMENTS

Figure 1:
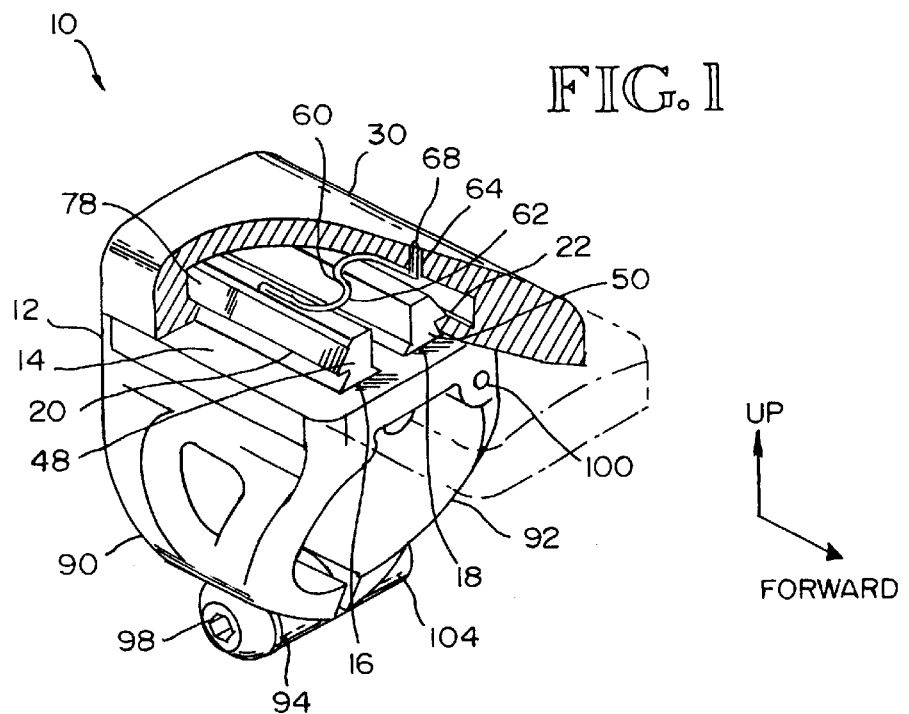
FIG. 1 is a front, top and right side isometric view of a retainer constructed in accordance with the present invention in which the slide has been partially cut away.
Figure 2:
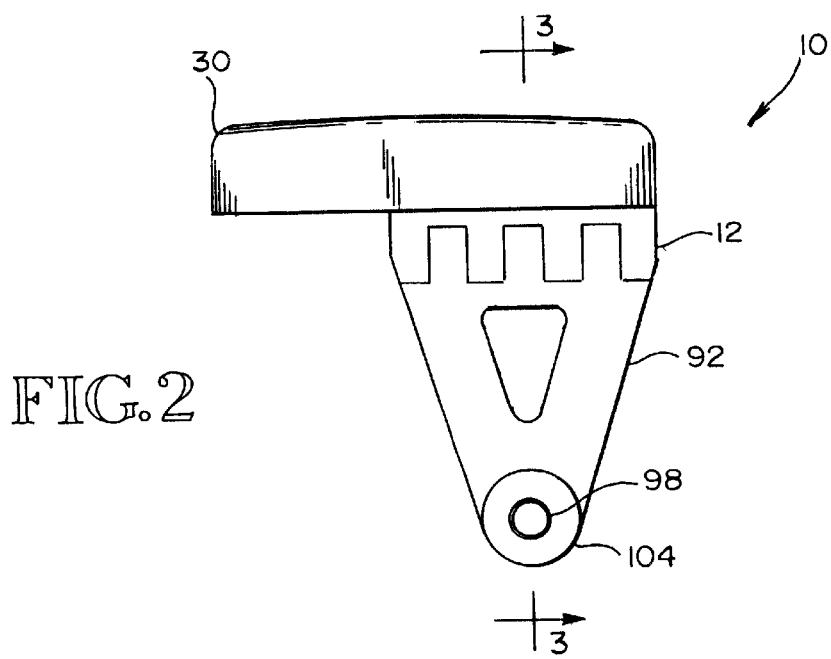
FIG. 2 is a right side view of the retainer.

The novel feature believed to be characteristics of this invention are set forth in the appended claims. The invention itself however may be best understood and its various objects and advantages best appreciated by reference to the detailed description below in connection with the accompanying drawings.

In FIGS. 1 through 6 of those drawings, a retainer constructed in accordance with the teachings of the present invention is illustrated and generally designated by the number 10. The retainer includes a base 12 which has a planar upper surface 14. A pair of parallel oriented rails 16 and 18 which are integrally molded as part of the base project upward from surface 14. Laterally projecting lips 20 and 22 are formed in rails 16 and 18 respectively.

Figure 3:
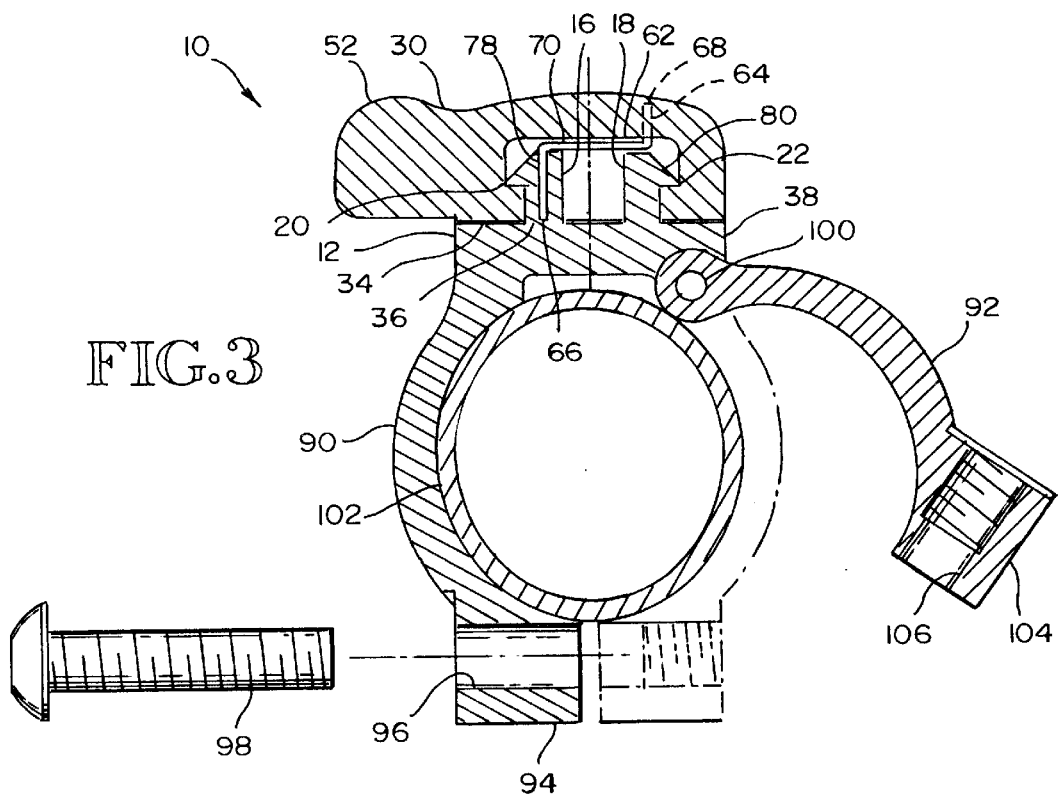
FIG. 3 is a sectional view taken at 3—3 of FIG. 2.
Figure 5:
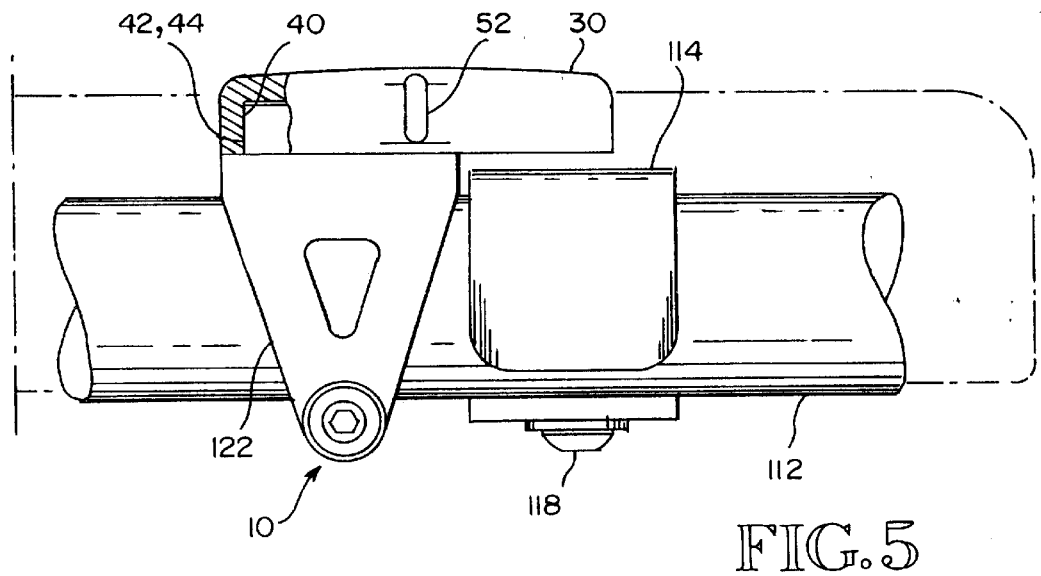
FIG. 5 is a is a left side view of the retainer showing it in the first operating position.
Figure 6:
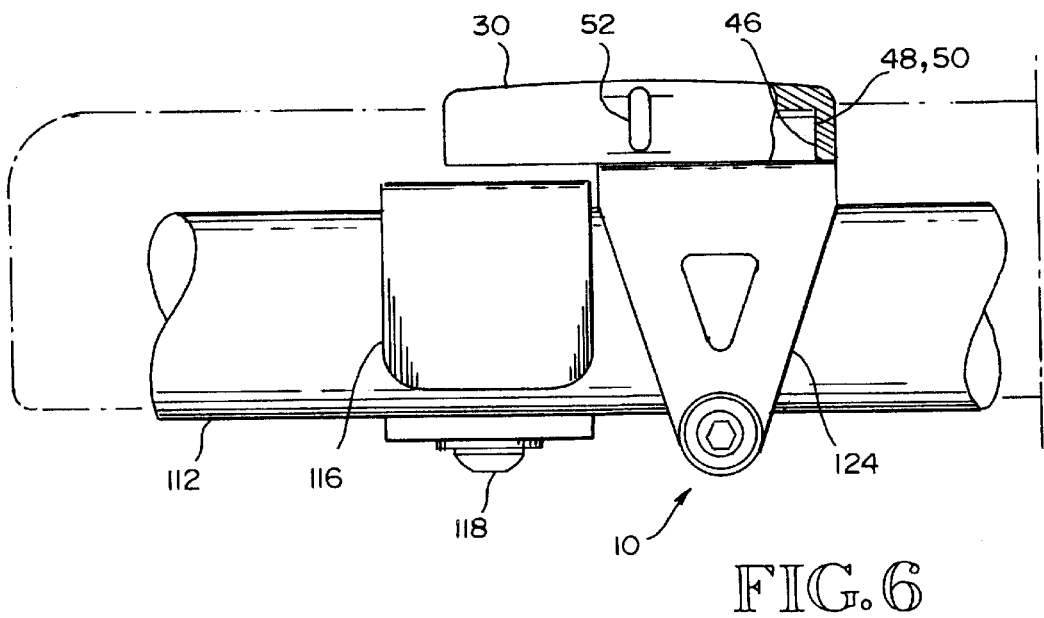
FIG. 6 is a left side view of the retainer showing it in the second operating position.

The retainer also includes slide 30 which is mounted on rails 16 and 18 for translation in a forward and aft direction. Referring to FIG. 3 it can be seen that the slide has a channel like recess 32 formed in its lower surface 34 which is shaped to slidably engage and retain the slide on rails 16 and 18. Specifically, protruding portions 36 and 38 of the slide engage lips 20 and 22 of the rails respectively in an interlocking fashion. Forward motion of the slide with respect to the base is limited to the position shown in FIG. 5. In that position inner wall 40 of the slide contacts ends 42 and 44 of rails 16 and 18 respectively as shown in the cut-away portion of the slide in that figure. Movement of the slide in the opposite or aft direction is limited when inner wall 46 of the slide strikes ends 48 and 50 of rails 16 and 18 respectively as seen in FIG. 6. The positions of the slide with respect to the base as shown in FIGS. 5 and 6 are referred to for convenience as first and second operating positions respectively. The slide may be conveniently moved along the rails by applying finger pressure to operating tab 52 which is integrally formed in the slide. The ability of the retainer to be moved bi-directionally into two opposing operating positions is a significant feature of the present invention.

Motion of the slide along the rails is influenced by spring 60 which is disposed between the slide and rail 16 as shown in FIGS. 1 and 6. The spring includes a central portion 62, end 64 which is bent upward at a 90 degree angle to the central portion and opposite end 66 which is bent downward at a 90 degree angle to the central portion. End 64 is positioned for rotation in bore 68 which extends vertically through slide 30 and end 66 is inserted into vertical bore 70 in rail 16. Spring 60 is formed so that when it is unloaded central portion 62 is in the shape of a shallow letter "s". In order to assemble the slide onto the base, the slide is positioned over rails 16 and 18, spring ends 64 and 66 are inserted into bores 68 and 70 respectively and the slide is then centered over the rails. With lower surfaces 34 resting on chamfered surfaces 78 and 80 of the rails, the slide is forced downward causing the rails to deflect inward slightly toward each other until protruding portions 36 and 38 pass over lips 20 and 34 respectively and snap into position beneath the lips.

When the slide is centered on the base midway between its first and second operating positions the spring is compressed a maximum amount and movement of the slide either forward or aft of that position will permit the spring to expand. Thus the spring and slide function as an over the center mechanism, biasing the slide toward one of the two operating positions when the slide is moved away from center. When the slide is moved forward of center it is biased toward the first operating position whereas when it is moved aft of center it is biased toward the second operating position. Because of this design feature, the slide will tend to remain in a selected operating position; if displaced somewhat from that position it will tend to return to it. This safety feature is also an important aspect of the present invention.

Means are also provided for mounting the retainer to the frame of the wheelchair. Referring to FIG. 3, those means preferably include fixed leg 90 which is integrally formed with base 12 and adjustable leg 92 which is pivotally mounted to the base. Boss 94 is formed in the lower portion of leg 90 and cylindrical bore 96 is formed in the boss to slidably receive screw 98. Adjustable leg 92 is pivotally mounted to base 12 by pin 100 for rotation between an open position and a position of engagement with typical wheelchair frame member 102 as shown in FIG. 6. Boss 104 is formed in a lower portion of the leg and includes bore 106 which is partially threaded to received screw 98.

The present retainer may be installed in the desired location on the frame by simply loosening screw 98 until it is clear of the threaded portion of bore 106 and opening adjustable leg 92 just enough that the frame member can pass between bosses 94 and 104. Next, leg 92 is closed against the frame member, screw 98 is re-threaded into boss 104, the retainer is positioned as desired and screw 98 is tightened sufficiently to hold the retainer in position.

Figure 4:
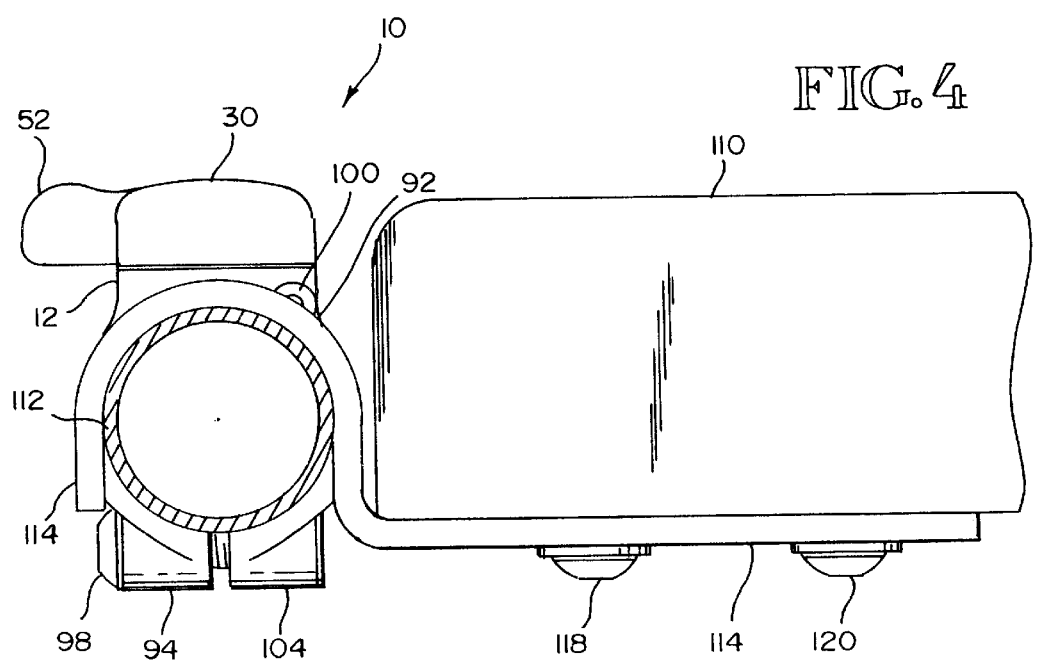
FIG. 4 is a front view of the subject retainer.

As stated above, the intended application for the retainer is to removably secure wheelchair accessories such as seats and back rests to a wheelchair frames. The retainer is particularly applicable to accessories which are supportable on the frame by means of a number of J-hook type support brackets such as shown in FIGS. 4 through 6. Seat 110 is supported on frame member 112 by a total of four J-hook brackets, of which brackets 114 and 116 are typical, with two mounted on each side of the seat. The brackets are fastened to the seat by a pair of fasteners such as fasteners 118 and 120. For safety reasons, each hook must be secured to the frame so that it cannot be raised from the frame member or slid axially along it. If a pair of the bi-directional retainers is mounted with respect to the brackets on opposing sides of the seat as shown in FIGS. 5 and 6 that requirement will be satisfied. Bi-directional retainer 122 is mounted just to the left of bracket 114 and bracket 124, which is identical to bracket 122, is mounted just to the right of bracket 116 so the seat is prevented from significant movement axially along frame member 112. By moving retainer 122 into the first operating position and retainer 124 into the second operating position the brackets are restricted against any significant vertical movement with respect to the frame. When it is desired to remove the seat from the frame each retainer is merely moved into the opposing operating position by applying finger pressure to tab 52 and raising the seat from the frame.

A significant advantage of the present invention is that pairs of identical retainers can be used to secure practically any accessory utilizing J-hook brackets or similar supports. Numerous retainers of other designs found in the prior art can be used for this purpose but many have only a single position of engagement and therefore must be mounted in a particular orientation with respect to a bracket in order to properly secure it in position. Such brackets must be manufactured and installed in symmetrical or mirror image pairs in order to prevent sliding of the accessory along the frame in one direction or another. It is apparent that the present invention offers a significant cost advantage over such prior art retainers.

Thus it can be seen that the present invention provides for an improved bi-directional retainer which incorporates many novel features and offers significant advantages over the prior art. Although only one embodiment of this invention has been illustrated and described it is to be understood that obvious modifications can be made of it without departing from the true scope and spirit of the invention. For example, springs of various other designs could be substituted for spring 60. Also various means for mounting the base to the wheelchair frame could be substituted for the clamp formed by the fixed and adjustable legs and the locking screw.

We claim:

1. A retainer comprising:
    a base including a track;
    a slide captively mounted on the track for translation between a first and a second spaced operating position and through a neutral position intermediate the two operating positions; and,
    means for biasing the slide toward the first operating position when the slide is positioned between the neutral position and the first operating position and for biasing the slide toward the second operating position when the slide is positioned between the neutral position and the second operating position.

2. The retainer of claim 1 wherein the slide is slidably mounted on the track.

3. The retainer of claim 1 wherein the means for biasing includes a spring.

4. The retainer of claim 1 further including means for mounting the base.

5. The retainer of claim 1 further including means for mounting the base on a wheelchair frame.

6. A retainer comprising:
    a base including a track;
    a slide captively mounted on the track for translation between a first and a second spaced operating position and through a neutral position intermediate the two operating positions;
    a spring disposed between the slide and the base for biasing the slide toward the first operating position when the slide is positioned between the neutral position and the first operating position and for biasing the slide toward the second operating position when the slide is positioned between the neutral position and the second operating position; and
    means for mounting the base on a wheelchair frame.

7. The retainer of claim 4 wherein the mounting means includes a first leg pivotally mounted to the base.

8. The retainer of claim 7 further including a second leg fixed to the base and means for adjustably securing the first and second legs.

9. The retainer of claim 8 wherein the means for securing includes a screw.

10. The retainer of claim 1 wherein the base includes a pair of parallel oriented tracks and wherein the slide is mounted on the tracks.

11. The retainer of claim 6 wherein the spring extends between the slide and the track.

12. A retainer for wheelchair accessories comprising:

a base including a pair of parallel oriented tracks;

a slide mounted on the tracks for sliding movement between two spaced operating positions;

a spring extending between the slide and the base for biasing the slide toward a selected one of the operating positions when the slide is displaced toward the selected operating position from a neutral position intermediate the two operating positions; and, a clamp for mounting the base to a wheelchair frame including a first leg fixed to the base, a second leg pivotally mounted to the base and a screw for adjustably connecting the first and second legs.

13. A retainer comprising:

a base including a track;

a slide captively mounted on the track for translation between a first and a second spaced operating position and through a neutral position intermediate the two operating positions; and, means for biasing the slide toward the first operating position when the slide is displaced from the neutral position toward the first operating position and for biasing the slide toward the second operating position when the slide is displaced from the neutral position toward the second operating position.

* * * * *